United States Patent [19]
Krumwiede

[11] 3,736,715
[45] June 5, 1973

[54] PREFABRICATED WALLS

[75] Inventor: Leland J. Krumwiede, Hibbing, Minn.

[73] Assignee: Nomeco Building Specialties, Inc., Hibbing, Minn.

[22] Filed: Sept. 15, 1971

[21] Appl. No.: 180,693

[52] U.S. Cl. .......................... 52/309, 52/404, 52/601
[51] Int. Cl. ............................. E04b 1/80, E04c 2/26
[58] Field of Search ...................... 52/601, 309, 746, 52/406, 407, 404

[56] References Cited

UNITED STATES PATENTS

| | | | |
|---|---|---|---|
| 1,649,872 | 11/1927 | Swisher | 52/601 |
| 3,245,185 | 4/1966 | Rowe | 52/601 X |
| 2,956,315 | 10/1960 | Lipp et al. | 52/309 |
| 3,389,518 | 6/1968 | Horbach | 52/746 X |
| 3,328,933 | 7/1967 | Lutze | 52/406 X |
| 1,858,701 | 5/1932 | Boettcher | 52/601 X |
| 2,844,848 | 7/1958 | Couse et al. | 52/309 |

Primary Examiner—Alfred C. Perham
Attorney—Merchant & Gould

[57] ABSTRACT

A prefabricated load-supporting building panel is disclosed. The panel consists of a metal stud frame to which a sheet of moisture proof gypsum board is affixed. A thickness of molded polystyrene, supported by a peripheral casing attached to the frame, is bonded to the gypsum board. Exterior finish for the panel consists of synthetic plastic which is trowled onto a glass fiber fabric bonded to the polystyrene.

10 Claims, 4 Drawing Figures

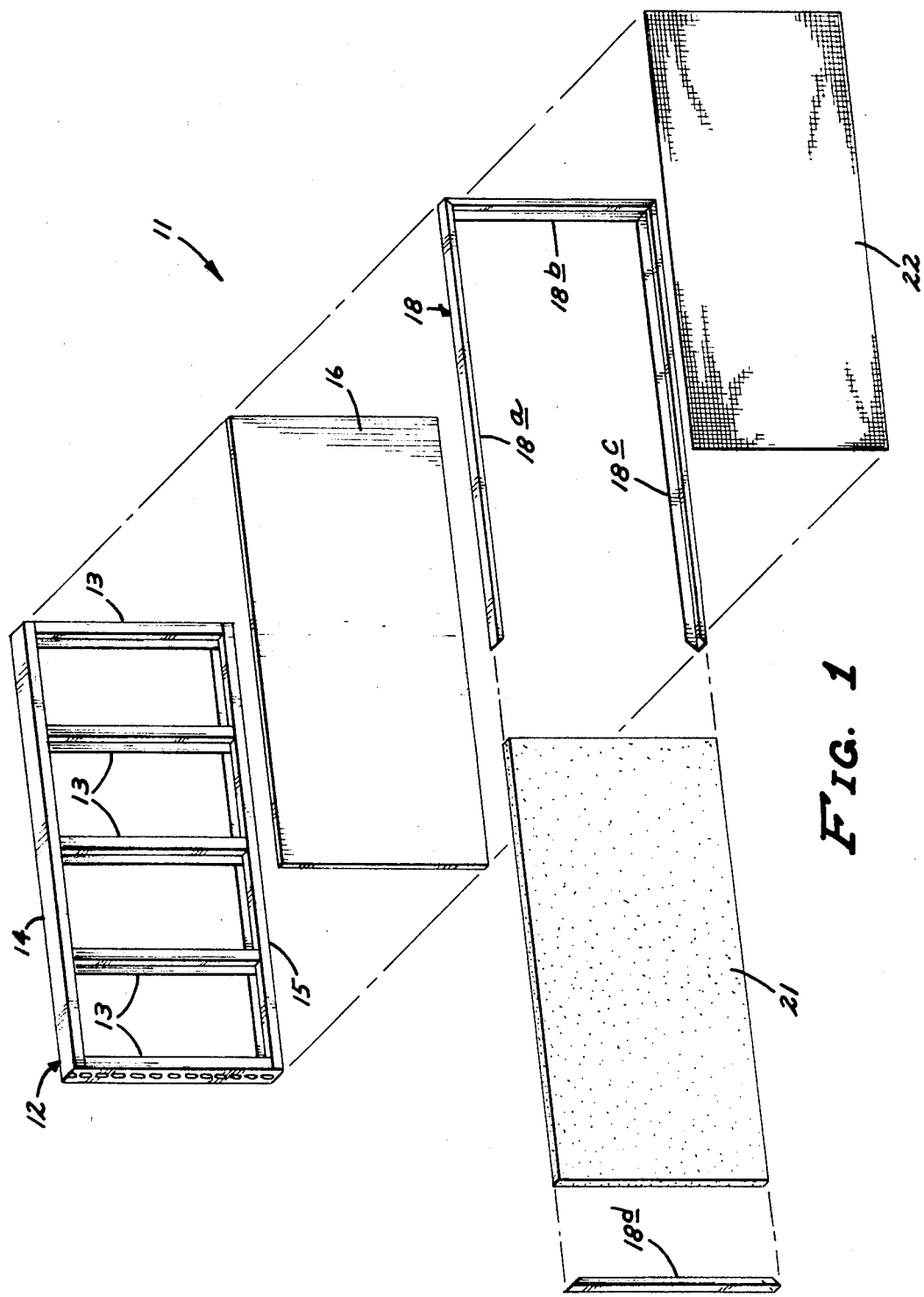

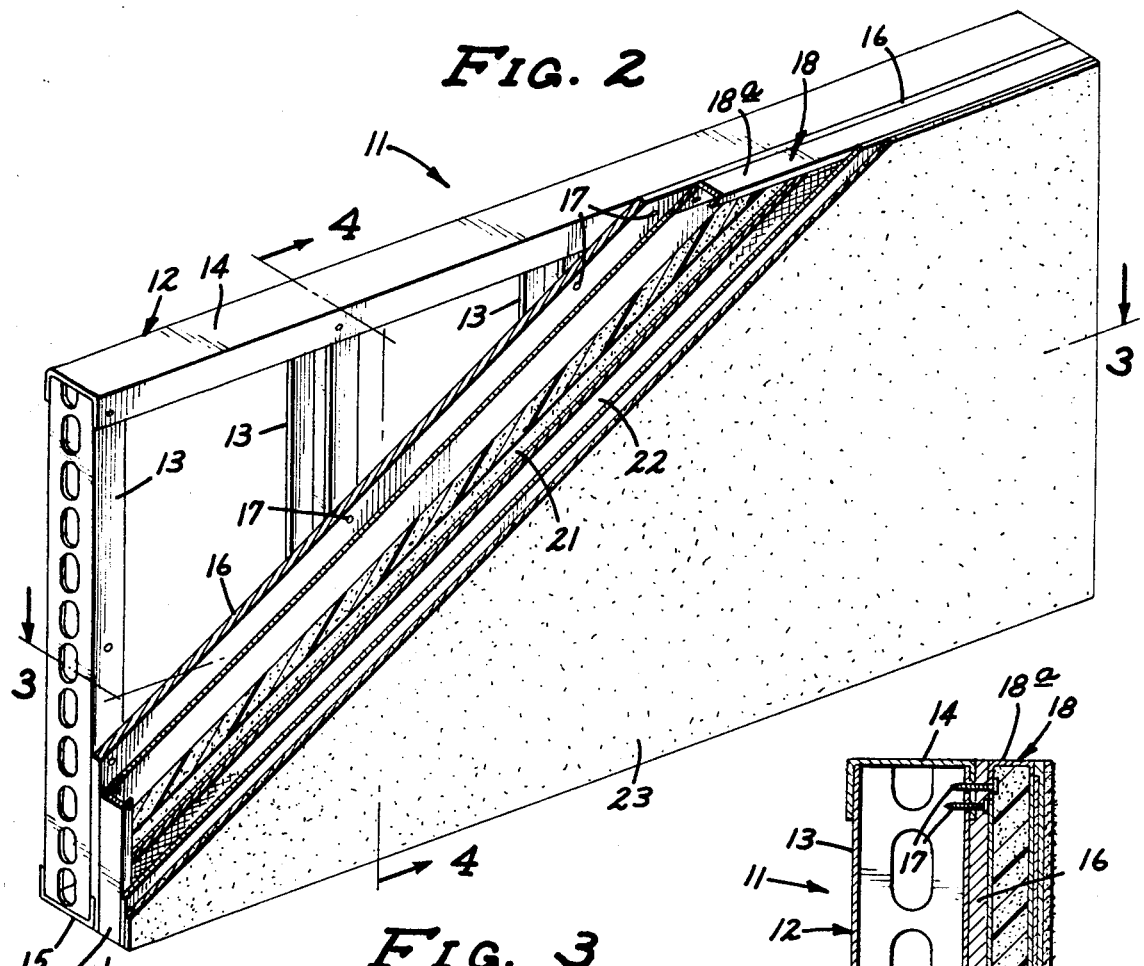
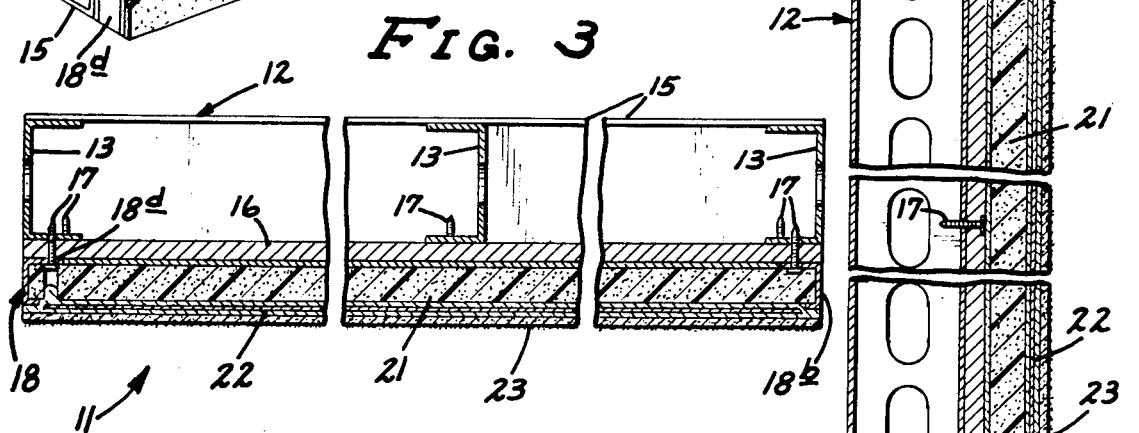
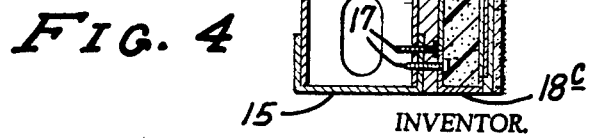

PREFABRICATED WALLS

The invention is directed to a prefabricated building panel.

One type of conventional building construction involves the initial formation of frame or stud walls, after which a thickness of external sheathing board is attached. The exterior surface may be in the form of siding or a masonry finish material (e.g., bricks or plaster). Thermal insulation is ordinarily placed within the stud wall, and it may be desirable to include a vapor or moisture barrier at some point in the construction procedure to maintain a desired humidity level within the building.

The inclusion of each of the aforementioned materials in the structure requires a separate step in the construction procedure, most of which must be performed by groups of specialized tradesmen. Consequently, the over-all construction process requires considerable time and expense from the standpoint of labor alone.

My invention contemplates a prefabricated building panel that is load-bearing, and which provides both thermal insulation and a moisture barrier to the structure when assembled. A steel stud wall serves as the base support for the unit, the outer face thereof having a sheet of moisture proof gypsum affixed thereto. A thickness of polystyrene, supported by a peripheral casing connected to the frame, is bonded to the gypsum; and synthetic plaster is applied to the polystyrene over glass fiber lath.

The panels can be constructed in any size or shape although they preferably conform in dimension to uniform building materials and construction practices. Due to their integral formation, the panels are quickly and easily assembled into a desired structure without reliance on specialized trade groups or dependence on a time coordinated construction procedure.

BRIEF DESCRIPTION OF THE DRAWINGS

FIG. 1 is an exploded perspective view of a prefabricated building panel embodying the inventive principle;

FIG. 2 is a perspective view of an inventive panel, part thereof being broken away;

FIG. 3 is a sectional view of the building panel taken along the line 3—3 of FIG. 2; and FIG. 4 is a sectional view of the building panel taken along the line 4—4 of FIG. 2.

DESCRIPTION OF THE PREFERRED EMBODIMENT

With reference to all the drawings, a prefabricated building panel embodying the inventive concept is represented generally by the numeral 11. Panel 11 is designed to serve as a load-bearing wall with primary support offered by a metal frame 12. As best shown in FIG. 2-4, frame 12 comprises a plurality of channel-shaped stud members 13 commonly connected by upper and lower cross members 14, 15, respectively. As shown, frame 12 is preferably rectangular in shape, and spacing of the studs 13 and cross members 14, 15 conforms to uniform building practices and materials.

Frame 12 defines inner and outer planar surfaces, the former of which is exposed to the inner building structure and adapted to receive interior finish materials.

The outer planar face of frame 12 receives a predetermined thickness of sheathing board 16, preferably asphalt treated, water-resistant gypsum board. As best shown in FIG. 4, gypsum board 16 is affixed to frame 12 by a plurality of self-drilling screws 17. A peripheral casing member 18 is also affixed to frame 12 (through gypsum board 16) by a plurality of self-drilling screws 17. Casing 18 is preferably formed from extruded plastic, and has a channel-shaped cross-section to define a receiving slot. As shown is FIG. 1, casing 18 consists of three integrally formed sides 18a, 18b and 18c which permit the receipt of a rectangular block of molded polystyrene 21, the thickness of which is chosen to snugly fit within the casing channel.

Before the polystyrene block 21 is inserted into the casing channel, gypsum board 16 is coated with an adhesive, preferably cementitious in nature, to form a bond between the gypsum and polystyrene. With the polystyrene 21 properly positioned, the fourth casing side 18d is affixed to sides 18a–c to complete the peripheral casing structure.

At this point, the outer surface of polystyrene 21 is coated with a cementitious adhesive, and a layer of lath 22 comprising an open weave glass fiber fabric is embedded therein. After the adhesive has dried to form a strong base, a finish coat 23 is trowled thereon. Finish coat 23 is preferably synthetic, comprising a plastic cementitious material mixed with silica sand. The synthetic plaster offers greater resistance to weather and provides an appealing exterior which can be premixed in a desired color.

From the foregoing, it will be apparent that the panel 11 is simply and easily prefabricated and provides a strong integral unit which is weather resistant, load supporting and serves as a thermal insulating barrier. A plurality of the panels 11 are easily assembled into a desired structure with the joints between panels filled with a conventional tape seal.

I claim:

1. A prefabricated building panel, comprising:
   a. a supportive frame of predetermined shape and thickness, the frame having inner and outer planar surfaces;
   b. a predetermined thickness of sheathing board affixed to the outer planar surface of the supportive frame;
   c. a peripheral casing of channel-shaped cross section conforming in shape to the supportive frame and sheathing board and affixed thereto, the casing extending around the periphery of the sheathing board to define a peripheral receiving channel;
   d. a block of self-supporting, low density thermal insulating material conforming in shape to the peripheral casing and having a thickness permitting it to fit snugly within the receiving channel;
   e. the peripheral casing having a removable section permitting the receipt of said insulation block in said peripheral receiving channel;
   f. and a decorative finish layer affixed to and covering the peripheral casing and thermal insulating block.

2. The building panel defined by claim 1, wherein the supportive frame is rectangular in shape and comprises a plurality of channel-shaped, metal stud members.

3. The building panel defined by claim 1, wherein said sheathing board comprises moisture proof gypsum.

4. The building panel defined by claim 1, wherein said insulating material comprises polystyrene.

5. The building panel defined by claim 4, wherein the polystyrene is bonded to the sheathing board.

6. The building panel defined by claim 1, wherein the finish layer comprises:
  a. a layer of lath comprising glass fiber fabric affixed to the insulating material with a cementitious adhesive;
  b. and a finish coat of synthetic plastic material covering the layer of lath.

7. A load-bearing prefabricated building panel comprising:
  a. a supportive, load-bearing frame of predetermined shape and thickness formed from a plurality of interconnected metal stud members, the frame defining inner and outer planar surfaces;
  b. a predetermined thickness of moisture proof gypsum board affixed to the outer planar surface of the frame;
  c. a plastic peripheral casing conforming in shape to the supportive frame and gypsum board and affixed thereto, the casing being constructed to define a receiving channel of predetermined depth extending around the gypsum board periphery;
  d. a block of self-supporting, low density thermal insulating material conforming in shape to the peripheral casing and having a thickness corresponding to the depth thereof, the insulation block being retainably disposed in said receiving channel and adhesively secured to the moisture proof gypsum board;
  e. a layer of lath comprising an open weave glass fiber fabric adhesively secured to the insulation block in covering relation therewith;
  f. and a finish coat of synthetic plastic material covering the layer of lath.

8. The panel defined by claim 7, wherein the insulating material comprises polystyrene.

9. The panel defined by claim 7, wherein the supportive frame is rectangular in shape.

10. The panel defined by claim 7, wherein the peripheral casing further comprises a removable section permitting the receipt of said insulation block in said peripheral receiving channel.

* * * * *